United States Patent [19]
Ogawa

[11] Patent Number: 5,535,382
[45] Date of Patent: Jul. 9, 1996

[54] DOCUMENT RETRIEVAL SYSTEM INVOLVING RANKING OF DOCUMENTS IN ACCORDANCE WITH A DEGREE TO WHICH THE DOCUMENTS FULFILL A RETRIEVAL CONDITION CORRESPONDING TO A USER ENTRY

[75] Inventor: Yasushi Ogawa, Yokohama, Japan

[73] Assignee: Ricoh Company, Ltd., Tokyo, Japan

[21] Appl. No.: 153,279

[22] Filed: Nov. 17, 1993

Related U.S. Application Data

[63] Continuation of Ser. No. 565,311, Jul. 27, 1990, abandoned.

[30] Foreign Application Priority Data

Jul. 31, 1989 [JP] Japan ..................... 1-196639

[51] Int. Cl.⁶ ........................... G06F 17/30; G06F 15/18
[52] U.S. Cl. .................. 395/600; 364/225.4; 364/274.6; 364/282.1; 364/963; 364/963.1; 364/974; 364/974.6; 364/DIG. 1; 364/DIG. 2; 364/419.19; 395/900; 395/934
[58] Field of Search ...................... 395/600, 800, 395/934, 900; 364/419.08, 419.19, 225.4, 274.6, 282.1, 963, 963.1, 974, 974.6

[56] References Cited

U.S. PATENT DOCUMENTS

| | | | |
|---|---|---|---|
| 4,506,326 | 3/1985 | Shaw et al. ................ | 395/700 |
| 4,554,631 | 11/1985 | Reddington .............. | 364/200 |
| 4,688,195 | 8/1987 | Thompson et al. ......... | 395/12 |
| 4,823,306 | 4/1989 | Barbic et al. ............ | 395/600 |
| 4,870,568 | 9/1989 | Kahle et al. ............. | 395/600 |
| 4,930,071 | 5/1990 | Tou et al. ............... | 395/600 |
| 4,991,087 | 2/1991 | Burkowski et al. ........ | 395/600 |
| 5,020,019 | 5/1991 | Ogawa ................... | 395/600 |
| 5,091,852 | 2/1992 | Tsuchida et al. ......... | 395/600 |
| 5,168,565 | 12/1992 | Morita .................. | 395/600 |
| 5,197,005 | 3/1993 | Shwartz et al. .......... | 364/419.13 |

OTHER PUBLICATIONS

"Probabalistic and Genetic Algorithms for Document Retrieval", Gordon, Communications of the ACM, vol. 31, No. 10, Oct. 1988, pp. 1208–1218.

"Data Base Management", McFadden et al., 1985, p. 195, Benjamin/Cummings, Menlo Park, Ca.

"An Introduction to Database Systems", Date, vol. 1, 1986, p. 337, Addison–Wesley, Reading, Mass.

Ronald A. Fisher, "Statistical Method For Research Workers," Oliver & Voyd Limited Publ., 1925, pp. 62–89 (English Translation from pp. 67–73).

Atsushi Tamura et al, "An Automatic Document Classification Method based on the Keyword Frequency Analysis," *Information Processing Society of Japan*, 36th National Convention's Papers, 1988, 1st Term, pp. 1305 and 1306.

(List continued on next page.)

*Primary Examiner*—Thomas G. Black
*Assistant Examiner*—Jack M. Choules
*Attorney, Agent, or Firm*—Woodcock Washburn Kurtz Mackiewicz & Norris

[57] ABSTRACT

A document retrieval system retrieves one or a plurality of registered documents from a document database responsive to retrieval conditions designated by a user. The document retrieval system includes a query converter for converting the retrieval condition designated by the user into a query which has a predetermined normal form in which keywords and at least one type of logical operation out of logical operations AND, OR and NOT are connected, a bibliographical information indicator for indicating a relation between each of said registered documents and keywords and a keyword connection table having relationship values, each of the relationship values representing the degree of relationship between each two keywords. The document retrieval system also includes a selector for referring the inverted file and the keyword connection so as to select one or a plurality of registered documents which satisfy the query, and an outputting circuit for outputting one or a plurality of registered documents selected by the selecting means.

16 Claims, 8 Drawing Sheets

OTHER PUBLICATIONS

Hayashi, "Quantitative Method," *Toyo Keizai Shinbunsha* 1974, pp. 27–36.

Myamoto et al, "Generation of a Pseudothesaurus for Information Retrieval Based on Cooccurrences and Fuzzy Set Operations," *IEEE Transactions on Systems, MAN, Cybernetics,* vol. SMC–13, No. 1, Jan./Feb. 1983, pp. 62–70.

Kousuke et al "String Matching Hardware Architecture," *Denshi Tsushin Gakkai Kenkyo Hokoku,* CPSY 86–57, Jul. 1986, pp. 57–68.

Teruhisa Miyake et al, "Generation of Descriptor Relations of a Database Based on Fuzzy Sets and Application to Information Retrieval," 4th Fuzzy System Symposium, May 30–31, 1988, pp. 309–312.

FIG.2

|    | K1  | K2  | K3  | K4  |
|----|-----|-----|-----|-----|
| K1 | 1.0 |     |     |     |
| K2 | 0.2 | 1.0 |     |     |
| K3 | 0.0 | 0.3 | 1.0 |     |
| K4 | 0.1 | 0.1 | 0.5 | 1.0 |

FIG. 7

| RANK | RELEVANCE VALUE | TITLE |
|---|---|---|
| | RETRIEVAL RESULT | EDIT   DISPLAY |
| 1 | 1.00 | * * * * * * |
| 2 | 0.78 | * * * * * * |
| 3 | 0.66 | * * * * * * |
| ⋮ | ⋮ | ⋮ |

FIG. 8

| BIBLIOGRAPHICAL INFO. | LEARNING |
|---|---|
| TITLE | * * * * * |
| KEYWORDS | $K_1$, $K_2$, $K_3$ |
| DATE | 1990.7.31 |
| TEXT | |
| ———————————— ———————————— ———————————— | |

DOCUMENT RETRIEVAL SYSTEM INVOLVING RANKING OF DOCUMENTS IN ACCORDANCE WITH A DEGREE TO WHICH THE DOCUMENTS FULFILL A RETRIEVAL CONDITION CORRESPONDING TO A USER ENTRY

CROSS-REFERENCE TO RELATED APPLICATIONS

This application is a continuation of U.S. patent application Ser. No. 07/565,311, filed Jul. 27, 1990.

The present patent application is assigned to the same Assignee as U.S. patent application Ser. Nos. 07/296,769 now U.S. Pat. No. 5,168,565, 07/405,122 now U.S. Pat. No. 5,212,697, 07/528,490 now U.S. Pat. No. 5,020,019, and 07/593,817 now U.S. Pat. No. 5,297,042.

BACKGROUND OF THE INVENTION

1. Field of the Invention

The present invention generally relates to a document retrieval system, and more particularly to a document retrieval system in which documents retrieved are given in an order starting from the document closest to the user's requirement so that it is possible to flexibly and quickly retrieve documents.

2. Related Art

In a conventional document retrieval system, at the time of registering documents in the system, an operator selects keywords fitting each document, then, each document for which keywords have been selected is classified on the basis of the thesaurus. When the keywords are added or eliminated, the thesaurus must be renewed. The renewal operation of the thesaurus is quite complex. In addition, when documents which nearly (not exactly) fulfill the user's requirement are retrieved, it is necessary to examine the requirement in detail. To eliminate these disadvantages, the document retrieval system in which a keyword connection and a relevance value are used has been proposed. The keyword connection represents the degree of relationship between each two keywords. The relevance value represents a document's a degree of relevance as a document corresponding to the user's requirement. The greater relevance value is given to the document which is closer to the user's requirement. For example, copending U.S. application Ser. No. 296,769, now U.S. Pat. No. 5,168,565 issued Dec. 1, 1992 proposes a document retrieval system in which the keyword connection and the relevance value are used so that it is possible to flexibly retrieve documents which are required by the user. In addition, Japanease Patent Application No. 63-187988 proposes a document retrieval system having a learning function. In this system, the weight of each relationship in the keyword connection is changed in accordance with the user's judgement and designation so that the user's judgement is reflected in the next retrieval result.

In the proposed document retrieval system, it is possible to retrieve documents only in a case where the user's query is represented by a keyword formula in which keywords are connected by only logical OR. However, a keyword formula which represents the user's arbitrary query generally contains keywords connected by logical AND, OR and NOT. A document retrieval process in which documents are retrieved on the basis of the keyword formula including logical AND, OR and NOT has not yet been developed. That is, in the document retrieval system in which the keyword connection and the relevance value are used, it is impossible to retrieve the document "not having a keyword X", and to retrieve the document "having both keywords X and Y".

SUMMARY OF THE INVENTION

Accordingly, a general object of the present invention is to provide a novel and useful document retrieval system in which the disadvantages of the aforementioned prior art are eliminated.

A more specific object of the present invention is to provide an improved document retrieval system in which the keyword connection and the relevance value are used.

Another specific object of the present invention is to provide a document retrieval system in which the relevance value is calculated in accordance with the keyword formula containing keywords connected by the logical OR, AND and NOT, and learning is performed, which changes the keyword connection so that the retrieval result fits the user's requirement.

The above mentioned objects of the present invention can be achieved by a document retrieval system for retrieving one or a plurality of registered documents from a document database responsive to retrieval conditions designated by a user, the document retrieval system comprising, query converting means for converting the retrieval condition designated by the user into a query, the query having a predetermined normal form in which keywords and at least one type of logical operation out of logical operations AND, OR and NOT are connected, bibliographical information indicating means for indicating the relation between each of the registered documents and keywords, a keyword connection table having relationship values, each of the relationship values representing the degree of relationship between each two keywords, selecting means for referring the bibliographical information indicating means and the keyword connection so as to select one or a plurality of registered documents which satisfy the query from the query converting means, and outputting means for outputting one or a plurality of registered documents selected by the selecting means. The selecting means comprises calculation means for calculating a relevance value for each of the registered documents corresponding the the query from the query converting means and one or plurality of relationship values corresponding to keywords given to each of the documents in the bibliographical information indicating means, one or a plurality of relationship values being obtained from the keyword connection table, the relevance value indicating the degree of relationship between the query and each of the registered documents, and storing means fof storing one of a plurality of registered documents in downward sequential order of the relevance value calculated by the calculation means.

The document retrieval system further comprises inputting means for inputting an evaluation value which indicates the degree of requirement of the user for each of the retrieved documents selected by the selecting means, and learning means for using the evaluation value input by the inputting means so as to modify one or a plurality of the relationship values in the keyword connection table.

Additional objects, features and advantages of the present invention will become apparent from the following detailed description when read in conjunction with the accompanying drawings.

BRIEF DESCRIPTION OF THE DRAWINGS

FIG. 2 is a view illustrating by example of a keyword connection table;

FIG. 7 illustrates a screen on which retrieval results are displayed.

FIG. 8 illustrates a screen on which titles of documents, bibliographical information, and the like, are displayed.

DESCRIPTION OF THE PREFERRED EMBODIMENTS

A description will now be given of a preferred embodiment of the present invention.

In a document retrieval system, which will be described below, the keyword connection and the relevance value are used. Thus, the user flexibly selects documents, which fulfill the user's requirement, on the basis of the relevance values. The keyword connection represents relationships among keywords. The keyword connection is made up of relationship values. Each of the relationship values represents the degree of a relationship between two keywords. The relationship value is considered to be in a range between "0" and "1". When the relationship value is equal to "0", there is no relationship between the corresponding two keywords. When the relationship value is greater than "0", there is some relationship between the corresponding two keywords. In addition, when the relationship value is equal to "1", the corresponding two keywords have the closest relationship with each other. The keyword connection is also expressed as a two dimensional arrangement of the relationship values. The relationship value between the i-th keyword Ki and the j-th keyword Kj is denoted as Wi[Kj], more simply as Wij.

The relevance value represents a document's degree of relevance as a document satisfying to the user's requirement. The greater relevance value is given to the document which is closer to the user's requirement.

Figure 1:
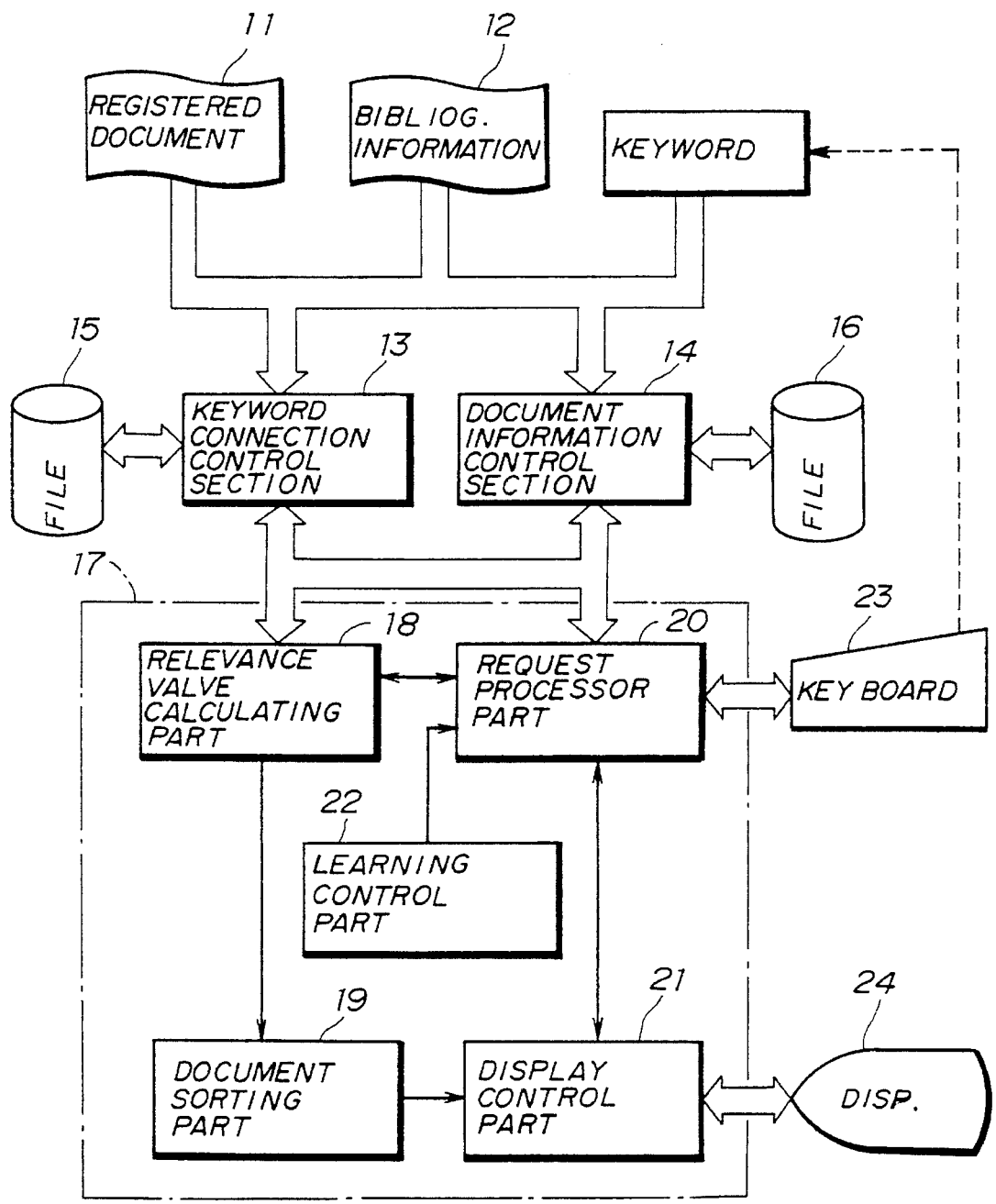
FIG. 1 is a basic block diagram illustrating a document retrieval system of a preferred embodiment according to the present invention.

FIG. 1 shows a basic structure of a document retrieval system.

A keyword connection control section 13 receives registered document 11 which is to be registered and bibliographical information 12 of the registered document 11. Keywords given to each document, which is input from the key board 23 by the user, is supplied to the keyword connection control section 13. Then, the keyword connection control section 13 generates the keyword connection table and stores it into a file 15. The keyword connection control section 13 manages the keyword connection table stored in the file 15. A document information control section 14 receives the registered document 11 and the bibliographical information 12 thereof and the keywords of each registered document. Then, the document information control section 14 stores the registered document 11 and the corresponding bibliographical information 12 as a document information database into a file 16. The document information control section 14 manages the document information database stored in the file 16. In addition, the keyword entered from the key board 23 is coupled to the corresponding registered document 11 and the document information control section 14 makes an inverted file which represents a relation between the input keywords and each document. The document information control section 14 stores the inverted file. The inverted file is one type of a bibliographical information indicating means which indicates the relation between the input keywords and each document. In the present invention, the bibliographical information indicating means is not limited to the inverted file. It is possible to provide another type of the bibliographical information indicating means such as an index file.

A document selection section 17 includes a relevance value calculating part 18, a document sorting part 19, a request processor part 20, a display control part 21 and a learning control part 22. The relevance value calculating part 18 uses the required information in the keyword connection table stored in the file 15 and calculates the relevance value of each document on the basis of a query transferred from the request processing part 20. A procedure for calculating the relevance value in more detail will be described later.

The document sorting part 19 sorts documents in which the relevance value is calculated in downward sequential order of the relevance value. The results of the sorted documents are transferred to the display control part 21. The display control part 21 permits the retrieval results to be displayed on a display device 24 in accordance with the user's designations which are input from the key board 24 and supplied through the request processing part 20. The learning control part 22 carries out a learning proces of the keyword connection in accordance with the user's designations from the request processing part 20. In the learning control part 22, a change of each relationship value in the keyword connection is calculated in accordance with the user's designation from the request processing part 20. The change of each relationship value is transferred to the keyword connection control section 13, and then the keyword connection control section 13 rectifys the keyword connection table stored in the file 15. A more detailed procedure for the learning will be described later.

The request processing part 20 transfers the query given by the user from the key board 23 to the relevance calculating part 18 for achieving a retrieval of documents fulfilling the user requests. The request processing part 20 also supplies an instruction relating to the learning to the learning control part 22.

Due to the document retrieval, appropriate documents which are required by the user are found, and the retrieval result is displayed on the display device 24.

The query which is the retrieval condition is explained by the keywords specified by the user and the bibliographical information in which the conditions for retrieving are determined. First, it is determined whether the conditions other than keywords, which are given to each document, fulfill the user's requests or not. Regarding the documents which have the conditions fulfilling the user's request, the relevance value thereof is calculated. On the other hand, regarding the documents which have no condition fulfilling the user's request, the relevance value is not calculated and "0" is determined as the relevance value thereof.

The user inputs the query expressing information which is requested by the user from the key board 23. The query is represented by one keyword or a plurality of keywords connected by the logical AND, OR and NOT. In a case where the information requested by the user is not expressed by one keyword, a plurality of the keywords are used.

Next, descriptions will now be given of (1) the query input to this document retrieval system, (2) the procedure for calculating the relevance value and, (3) the procedure for the learning of keyword connection.

Figure 3:
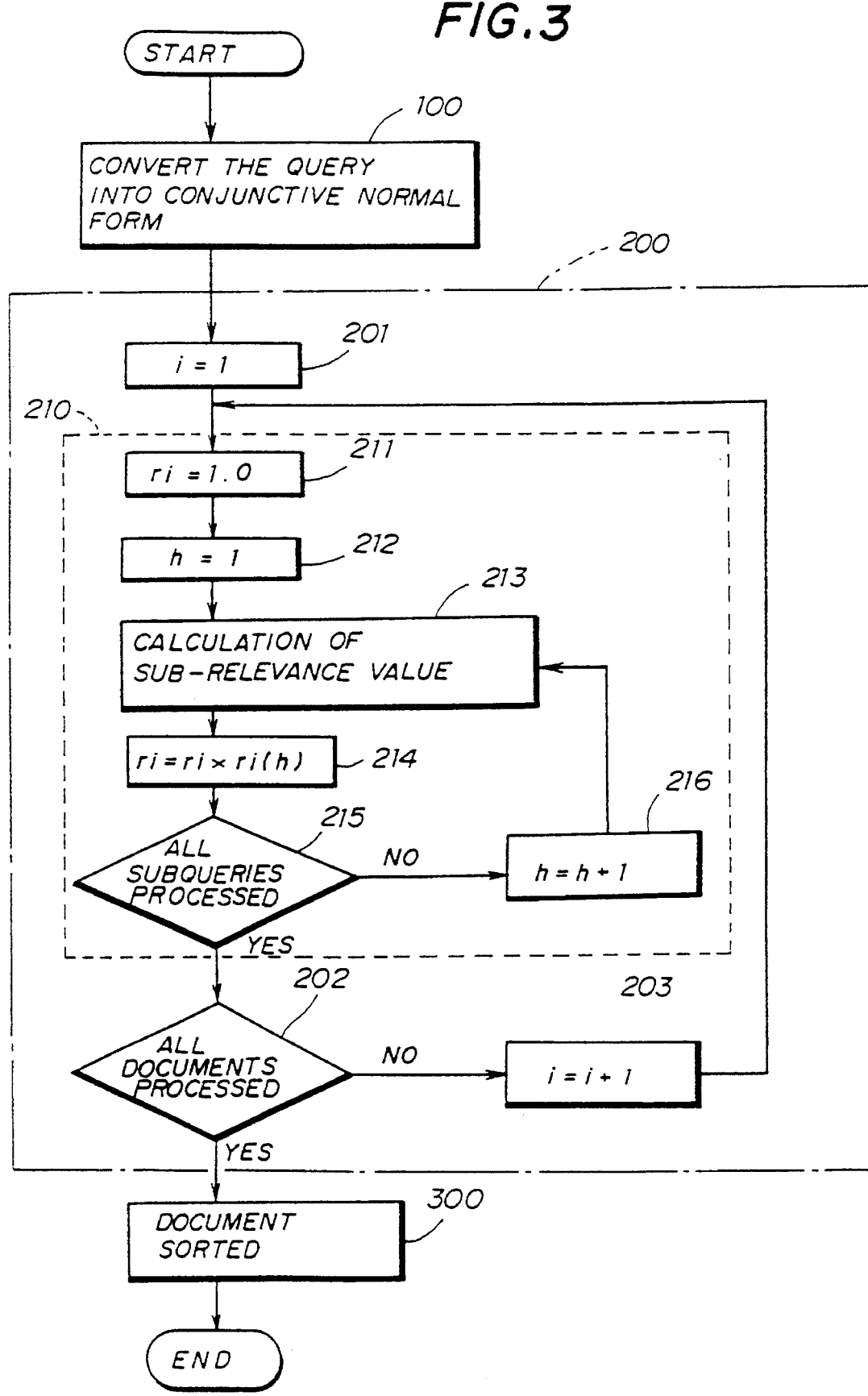
FIG. 3 is a flowchart illustrating a document retrieval process in the system shown in FIG. 1.

The document selection part 17 retrieves documents in accordance with the flowchart shown in FIG. 3. In the flowchart, step 100 is performed in the request processing part 20. Step 200 is performed in the relevance value calculating part 18. Step 300 is performed in the document sorting part 19.

(1) The query from the user:

The query input from the key board 23 is expressed by the plurality of the keywords connected by the logical AND, OR and NOT. That is, it is possible for the user to order the document retrieval system "a document which does not have a keyword A", "a document which fulfills a condition where there are both keywords A and B", and the like.

The query can be converted into a conjunctive normal form. The conjunctive normal form includes subqueries. The subqueries are connected by only the logical AND with each other. Then, each of the subqueries is expressed by keywords connected by the logical OR and NOT. The request processing part 20 converts the query from the key board 23 into the conjunctive normal form step 100). The query in the conjunctive normal form is written as:

$$\text{Query} = SQ(1) * \ldots * SQ(N) \quad (1)$$

where "*" represents the logical AND, and N is equal to or greater than 1 ($N \geq 1$). SQ(h) (h=1, ..., N) is the subquery, and is written as:

$$SQ(h) = Kq_1 + \ldots + Kq_n + !Kq_{n+1} + \ldots + !Kq_{n+m} \quad (2)$$

where $Kq_i$ represents the i-th keywords, and "+" and "!" respectively denote the logical OR and the logical NOT. Then, "n" is equal to or greater than 0 ($n \geq 0$), "m" is equal to or greater than 0 ($m \geq 0$) and "n+m" is equal to or greater than 1 ($n+m \geq 1$). When $Q^+$ (h) is a set including the keywords without NOT, and $Q^-$ (h) is a set including the keywords with NOT, $Q^+$ (h) and $Q^-$ (h) are respectively represented as:

$$Q^+(h) = \{Kq_1, \ldots, Kq_n\}$$

$$Q^-(h) = \{Kq_{n+1}, \ldots, Kq_{n+m}\}.$$

Thus, no keyword is included in both sets $Q^+$ (h) and $Q^-$ (h). The request processing part 20 checks whether or not there is a keyword which is included in both the sets $Q^+$ (h) and $Q^-$ (h) in each of the subqueries. Then, if the request processing part 20 detects a keyword included in both the sets $Q^+$ (h) and $Q^-$ (h), this checking result is displayed on the display device 24, and thus the user can be made aware of errors.

(2) The calculation of the relevance value:

The relevance value represents the degree of relationship between the retrieval condition (the query) and each document. The relevance value calculating part 18 calculates the relevance value of each document in accordance with step 200 shown in FIG.3.

The relevance value is calculated as follows.

First, a relevance value of the subquery (termed a sub-relevance value) is calculated. The sub-relevance value is calculated by step 213 shown in FIG. 3.

Second, a product of sub-relevance values of all subqueries is calculated so that the relevance value of one document is obtained. Steps 213 through 216 are repeated so that the relevance value of one document is calculated.

The relevance values of all documents are calculated, and then appropriate documents are selected by a threshold process or the like depending on the user's designation. Finally, the appropriate documents are retrieved.

In the flowchart shown in FIG. 3, document number i is initially set to "1" in step 201, the initial sub-relevance value ri is set to "1.0" in step 211, and then the sub-condition number h which is a number given to each sub-query is initially set to "1" in step 212. After that, step 213 calculates the h-th sub-relevance value ri(h) on the basis of the following formula:

$$ri(h) = 1 - \left\{ \prod_{Kj \in Q^+(h)} Sij \right\} \cdot \left\{ \prod_{Kj \in Q^-(h)} Rij \right\} \quad (3)$$

In the formula (3), when Ai is a set of keywords of i-th document, Rij and Sij are respectively defined as follows:

$$Rij \equiv 1 - \prod_{Kk \in Ai} (1 - Wjk) \quad (4)$$

$$Sij \equiv 1 - Rij = \prod_{Kk \in Ai} (1 - Wjk) \quad (5)$$

In these formulas (4) and (5), Wjk denotes the degree of the relationship between the k-th keyword and the j-th keyword. That is, Wjk is the relationship value in the keyword connection matrix.

When the set $Q^+$ (h) or the set $Q^-$ (h) is the empty set ($\phi$), the sub-relevance value is calculated on the basis of the following formulas, instead of the formula (3) described above:

$$ri(h) = 1 - \left\{ \prod_{Kj \in Q^+(h)} Sij \right\} \quad Q^-(h) = \phi \quad (6)$$

$$ri(h) = 1 - \left\{ \prod_{Kj \in Q^-(h)} Rij \right\} \quad Q^+(h) = \phi \quad (7)$$

After calculating in step 213 as has been described above, the sub-relevance value ri(h) which is obtained by the calculation in step 213 is multiplied by the ri value which was obtained last time. Then the product of ri×ri(h) becomes a new ri value. This process is performed in step 214. While the sub-condition number h is successively incremented to N (steps 215 and 216), the calculations in steps 213 and 214 are performed. Then finally, step 213 calculates all sub-relevance values of N subqueries, and the final ri value in step 214 becomes as follows.

$$ri = \prod_{h=1}^{N} ri(h) \quad (8)$$

The final ri value is the relevance value of the document including a set Ai of keywords.

While the document number i is successively incremented (steps 202 and 203), the relevance value is calculated as has been described above. Finally, the relevance values of all registered documents are sorted in downward sequential order thereof by step 300 which is a process performed by the document sorting part 19. Then, the appropriate document selected by the threshold process or the like is displayed on the display device 24.

A description will now be given of an example of the calculation of the relevance value.

Example 1: when the query is

Query=!(K1 * K2+K3)+K4, the relevance value r1 of the document, including keywords {K1, K2}, is calculated. The keyword connection matrix of keywords K1, K2, K3 and K4 is given as shown in FIG. 2. In the relationship values in the keyword connection matrix, Wij is equal to Wji (Wij=Wji) so that the keyword connection is indicated as a triangular form.

The query is converted into the conjunctive normal form by De Morgan's rules. That is, Query=(!K1+!K2+K4)*(!K3+K4).

In this case, $S11=W11+W12=1.0+0.2=1.0, R11=0.0,$ $S12=W21+W22=0.2+1.0=1.0, R12=0.0,$ $S13=W31+W32=0.0+0.3=0.3, R13=0.7,$ $S14=W41+W42=0.1+0.1=0.19, R14=0.81.$ Then, $r1(1) = 1.0 - R11 \times R12 \times S14$
$= 1.0 - 0.0 \times 0.0 \times 0.19 = 1.0$
$r1(2) = 1.0 - 0.7 \times 0.19 = 0.867.$ Accordingly, $r1=r1(1) \times r1(2)=1.0 \times 0.867=0.867$ That is, in this case, the relevance value of the document is equal to 0.867.

On the other hand, the query can be also converted into a disjunctive normal form. The disjunctive normal form includes subqueries. The subqueries are connected by only the logical OR with each other. Each of the subqueries is expressed by keywords connected by the logical AND and NOT. Then, after converting the query into the disjunctive normal form, the relevance value of each document can be calculated by using the disjunctive normal form.

The query in the disjunctive normal form is written as:

$$Query=SQ(1)+ \ldots +SQ(N) \quad (9)$$

where N is equal to or greater than 1 (N≥1). SQ(h) (h=1, . . . , N) is the subquery, and is written as:

$$SQ(h)=Kq_1 * \ldots * Kq_n *!Kq_{n+1} * \ldots *!Kq_{n+m} \quad (10)$$

where $Kq_i$ represents the i-th keywords. Then, "n" is equal to or greater than 0 (n≥0), "m" is equal to or greater than 0 (m≥0) and "n+m" is equal to or greater than 1 (n+m≥1). When $Q^+$ (h) is a set including the keywords without NOT, and $Q^-$ (h) is a set including the keywords with NOT, $Q^+$ (h) and $Q^-$ (h) are respectively represented as:

$Q^+(h)=\{Kq_1, \ldots, Kq_n\}$ $Q^-(h)=\{Kq_{n+1}, \ldots, Kq_{n+m}\}.$

Thus, no keyword is included in both sets $Q^+$ (h) and $Q^-$ (h).

The relevance value of one document is calculated as follows.

When the sub-relevance value corresponding to the h-th subquery is ri(h), the sub-relevance value is calculated on the basis of the following formula.

$$ri(h) = \left( \prod_{Kj \in Q^+(h)} Rij \right) \left( \prod_{Kj \in Q^-(h)} Sij \right) \quad (11)$$

In the formula (13), Rij and Sij are the same ones difined by formulas (4) and (5).

After the sub-relevance values are calculated by the formulas (11) (4) and (5), the relevance value ri of the i-th document is finally calculated as follows:

$$ri = 1 - \prod_{h=1}^{N} (1 - ri(h)) \quad (12)$$

Thus, the relevance value of the document can be calculated on the basis of formulas (11) (4) (5) and (12). In the case where the query is converted into the disjunctive normal form, the relevance value of the document is calculated in accordance with substantially the same flowchart as shown in FIG. 3. In this case, the calculations of the formulas (11) (4) and (5) are performed in step 213, and the calculation of the formula (12) is performed in step 214.

A description will now be given of an example of the calculation of the relevance value.

Example 2: when the query is

Query=K1+(K2 * K3)

the relevance value r1 of the document, including keywords {K3, K4}, is calculated. The keyword connection of keywords K1, K2, K3 and K4 is given as shown in FIG. 2.

In this case, the query can be converted into the conjunctive normal form as follows:

Query=(K1+K2) * (K1+K3).

However, when the relevance value is calculated in accordance with the query converted into the disjunctive normal form, it is not necessary for the query to convert into the conjunctive normal form, as the query given above is represented by the disjunctive normal form.

That is, the relevance value of the i-th document is calculated as follows:

$Ri1=1-(1-W13)(1-W14)=1-(1-0.0)(1-0.1)=0.1$ $Ri2=1-(1-W23)(1-W24)=1-(1-0.3)(1-0.1)=0.37$ $Ri3=1-(1-W33)(1-W34)=1-(1-1.0)(1-0.5)=1.0$

Then, the sub-relevance values are calculated as follows:

$ri(1)=Ri1=0.1$ $ri(2)=Ri2 \times Ri3=0.37 \times 1.0=0.37$

Accordingly, $$ri = 1 - (1-0.1) \times (1-0.37) = 0.433$$

That is, in this case, the relevance value of the document is equal to 0.433.

(3) The procedure for the learning of keyword connection:

(3-1) In the case where the query is expressed by the conjunctive normal form;

The user selects a document (i-th document), for which it is necessary to correct the relevance value, from a document list in which the retrieved documents are arranged in downward sequential order of relevance value. The user inputs, from the key board 23, a evaluation value t which indicates the degree of the requirement of the user for the i-th retrieved document. In the learning of the keyword connection, when the evaluation value t is greater than the relevance value ri of the i-th document (t>ri), the relationship values in the keyword connection matrix are changed so that the relevance value ri of the i-th document increases. Then, when the evaluation value t is less than the relevance value ri (t<ri), the relationship values in the keyword connection are changed so that the relevance value ri of the i-th document decreases. In addition, when the evaluation value t is equal to the relevance value ri, the learning of the keyword connection is not performed.

The learning of the keyword connection is carried out by the learning control part 22. The basic procedure for the learning of the keyword is, for example, proposed in Japanese Patent Application No. 1-132696. That is, at the time of learning, when the user judges that the retrieved document is completely irrelevant, the evaluation value of the document is equal to "0", and when the user judges that the retrieved document is completely relevant, the evaluation value of the document is equal to "1". Then, when the user is vague about whether the retrieved document is relevant or not, the evaluation value is an arbitrary value between "0" and "1".

When the evaluation value expressing the user's judgement for the document having the relevance value X is "t", an evaluation function is defined as follows.

$$E(X) = (½)(t-X)^2 \quad (13)$$

In one learning process, all relationship values in the keyword connection matrix are modified so as to reduce the value of the evaluation function $E(ri)$ for the retrieved i-th document having the relevance value ri. That is, the relationship value $Wmn$ is modified as follows:

$$Wmn \rightarrow g(Wmn + \Delta Wmn) \quad (14)$$

In this formula, $g(\ )$ is a normalizing function to ensure that the modified relationship value remains within a range between "0" and "1".

$$g(x) = \begin{cases} 1 & 1 < x \\ 1 & 0 \leq x \leq 1 \\ 0 & x < 0 \end{cases} \quad (15)$$

The changing value $\Delta Wmn$ is calculated as follows by using the gradient descent method:

$$\Delta Wmn = -\alpha \frac{\partial E(ri)}{\partial Wmn} \quad (16)$$

$$= \alpha (t - ri) \frac{\partial ri}{\partial Wmn}$$

In the formula (16), $\alpha$ is a learning coefficient of a positive real number. Then, according to the formula (8) described above, the following formula is obtained:

$$\frac{\partial ri}{\partial Wmn} = \sum_{h=1}^{N} \left\{ \frac{\partial ri(h)}{\partial Wmn} \prod_{\substack{k=1 \\ s.t. k \neq h}}^{N} ri(k) \right\} \quad (17)$$

Thus, the changing value $\Delta Wnm$ is calculated in accordance with the following formula:

$$\Delta Wmn = \alpha(t - ri) \sum_{h=1}^{N} \left\{ \frac{\partial ri(h)}{\partial Wmn} \prod_{\substack{k=1 \\ s.t. k \neq h}}^{N} ri(k) \right\} \quad (18)$$

In the formula for which the changing value $\Delta Wnm$ is calculated, $(\partial ri(h)/\partial Wmn)$ is calculated in accordance with formulas (19) (20) and (21) as will be described later. In a case other than the case where the set (m,n) fulfills the condition where $Km \in$ Query and $Kn \in Ai$, the changing value $\Delta Wmn = 0$, so that the changing value $\Delta Wmn$ is calculated with regard to only a set (m,n) which fulfills the condition where $Km \in$ Query and $Kn \in Ai$.

The partial differential $(\partial ri(h)/\partial Wmn)$ must be calculated to obtain the changing value $\Delta Wmn$. Due to the assumption that no keywords are included in both the set $Q^+(h)$ and the set $Q^-(h)$, the partial differential $(\partial ri(h)/\partial Wmn)$ can be calculated in each of three cases as follows.

① First case: $Km \in$ Query $$\frac{\partial ri(h)}{\partial Wmn} = \begin{cases} \frac{1 - ri(h)}{1 - Wmn} & Kn \in Ai \,\&\, Wmn \neq 1 \\ \left\{ \prod_{\substack{Kj \in Q^+(h) \\ Kk \in Ai \\ s.t.(j,k) \neq (m,n)}} (1 - Wjk) \right\} \left\{ \prod_{Kj \in Q^-(h)} Rij \right\} & Kn \in Ai \,\&\, Wmn = 1 \\ 0 & Kn \in Ai \end{cases} \quad (19)$$

② Second case: $Km \in Q^-(h)$ $$\frac{\partial ri(h)}{\partial Wmn} = \begin{cases} -\frac{1 - Rim}{Rim} \cdot \frac{1 - ri(h)}{1 - Wmn} & Kn \in Ai \,\&\, Wmn \neq 1 \,\&\, Rim \neq 0 \\ -(1 - ri(h)) \left\{ \prod_{\substack{Kk \in Ai \\ s.t. k \neq n}} (1 - Wmk) \right\} & Kn \in Ai \,\&\, Wmn = 1 \\ -\left\{ \prod_{Kj \in Q^+(h)} Sij \right\} \left\{ \prod_{\substack{Kj \in Q^-(h) \\ s.t. j \neq m}} Rij \right\} & Kn \in Ai \,\&\, Rim = 0 \\ 0 & \text{otherwise} \end{cases} \quad (20)$$

③ Third case: $Km \in Q^+(h)$ or $Km \in Q^-(h)$ $$\frac{\partial Ri(h)}{\partial Wmn} = 0 \quad (21)$$

The result calculated in accordance with one of the formulas (19) (20) and (21) is substituted for the formula (18) so that the changing value $\Delta Wmn$ is obtained.

Furthermore, the formula (18) to calculate the changing value $\Delta Wmn$ can be simplified. The calculating formula in the case where ri is not equal to "0"(ri≠0) differs from the calculating formula in the case where ri is equal to "0"(ri=0).

In the case where ri≠0:

ri(h) is not equal to "0" for all h (1≦h≦N), so that, from the formula (8), the following formula is obtained:

$$\prod_{\substack{k=1\\s.t.k\neq h}}^{N} ri(k) = \frac{ri}{ri(h)} \quad (22)$$

Therefore, the formula (17) is converted as follows:

$$\frac{\partial ri}{\partial Wmn} = ri \left\{ \sum_{h=1}^{N} \frac{\partial ri(h)}{\partial Wmn} \frac{1}{ri(h)} \right\} \quad (23)$$

Thus, $$\Delta Wmn = \alpha (t - ri) \, ri \left\{ \sum_{h=1}^{N} \frac{\partial ri(h)}{\partial Wmn} \frac{1}{ri(h)} \right\} \quad (24)$$

In the case where ri=0:

In this case, formulas differ from each other in accordance with the number of the subquery in which the sub-relevance value ri(h) is equal to "0". When the number of the subquery in which ri(h)=0 is equal to "1" the formula (17) is converted as follows:

$$\frac{\partial ri}{\partial Wmn} = \left\{ \frac{\partial ri(h^*)}{\partial Wmn} \prod_{\substack{k=1\\s.t.k\neq h^*}}^{N} ri(k) \right\} \quad (25)$$

In the formula (25), h* makes ri(h*)=0. Thus, $$\Delta Wmn = \alpha (t - ri) \frac{\partial ri(h^*)}{\partial Wmn} \left\{ \prod_{\substack{k=1\\s.t.k\neq h^*}}^{N} ri(k) \right\} \quad (26)$$

When the number of the subquery in which ri(h)=0 is equal to or greater than "2" the formula (11) is converted as follows:

$$\frac{\partial ri}{\partial Wmn} = 0 \quad (27)$$

Thus, $$\Delta Wmn = 0 \quad (28)$$

In the learning of the keyword connection as has been described above, the user inputs the evaluation value t for the i-th retrieved document having the relevance value ri. Then, the learning part 22 carries out the process in accordance with the flowchart shown in FIG. 4.

Figure 4:
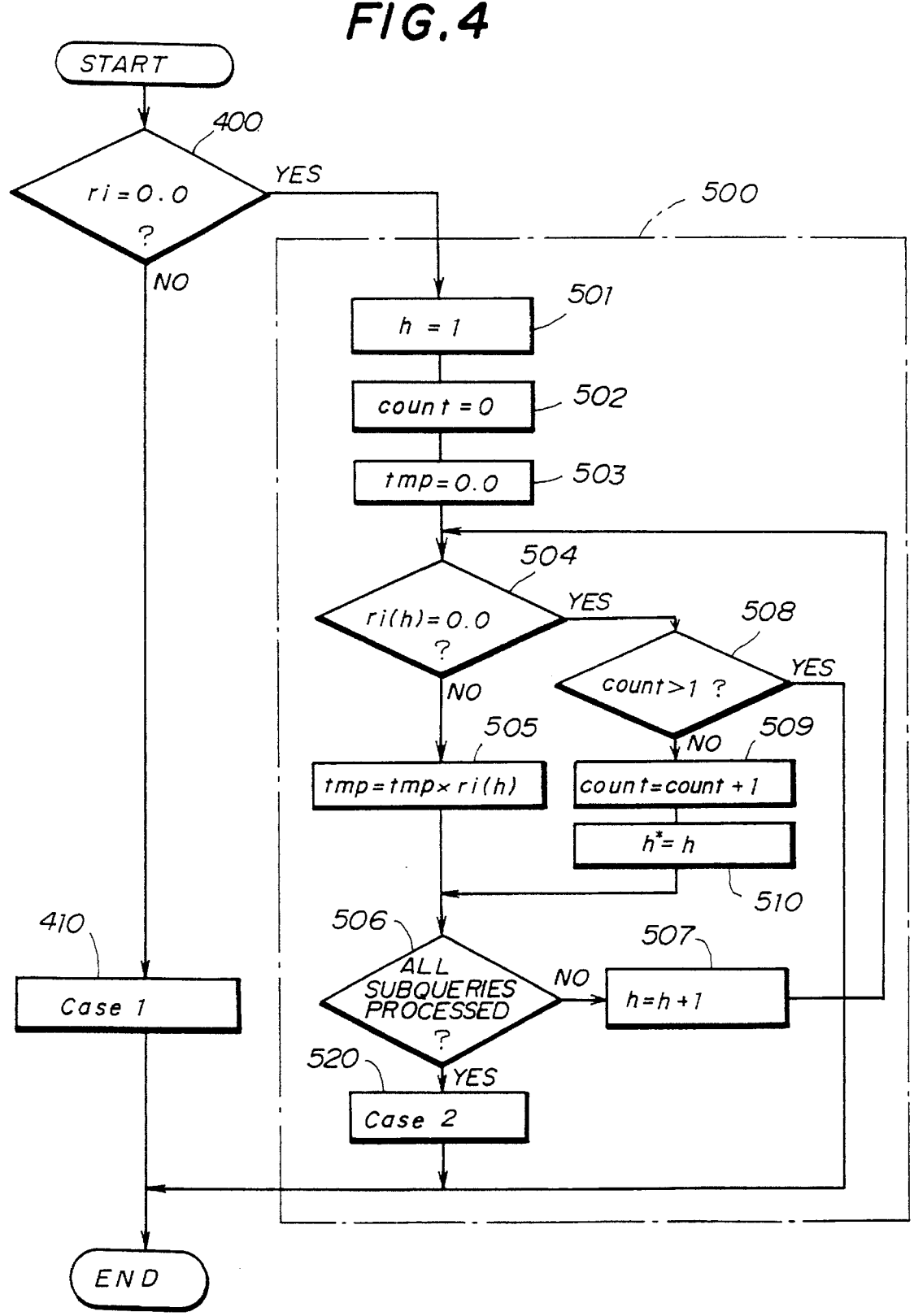
FIG. 4 is a flow chart illustrating a process executed according to the present invention.
Figure 5:
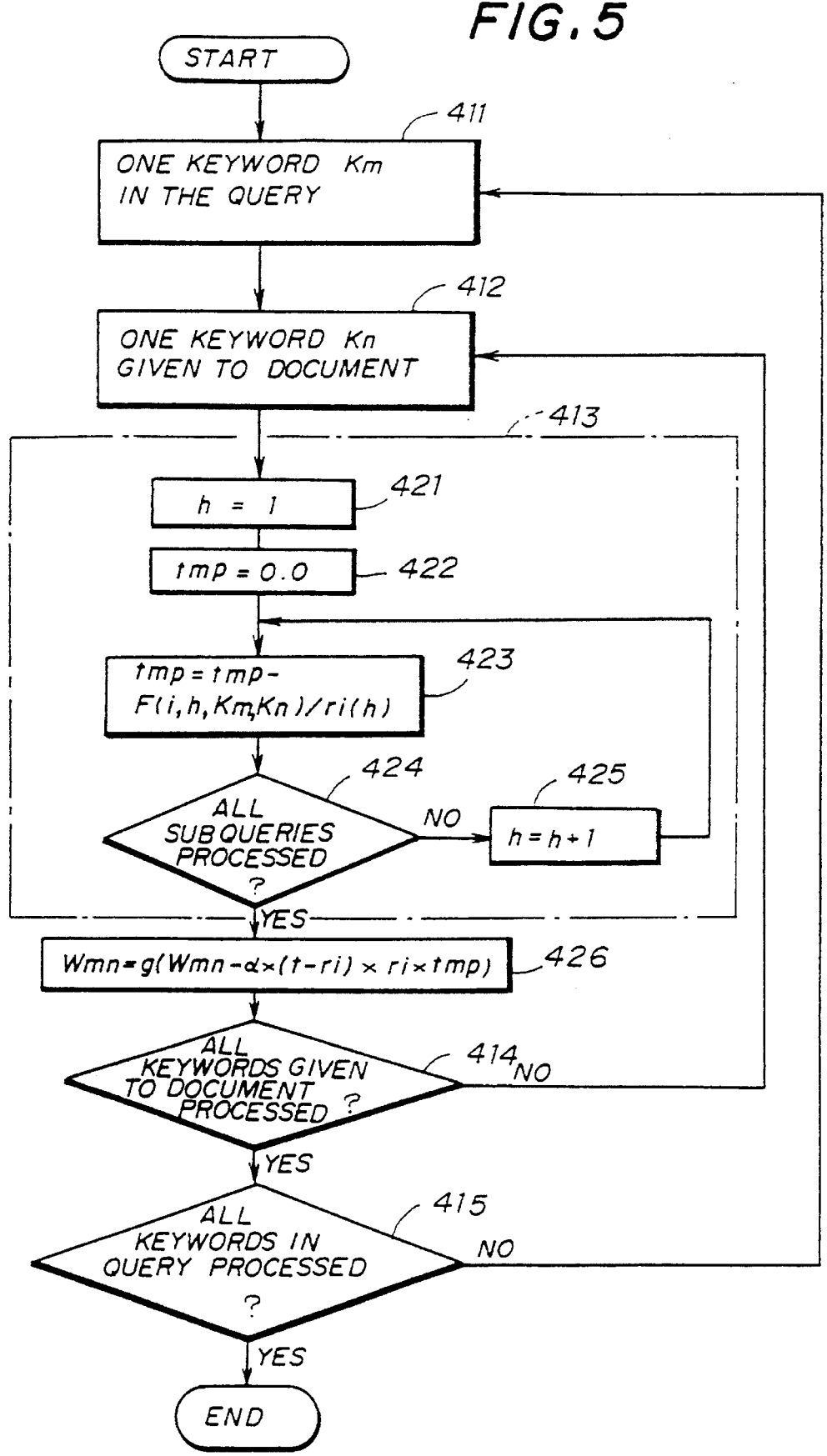
FIG. 5 is a flow chart illustrating a process executed by the present invention according to a first case of FIG. 4.

Referring to FIG. 4, step 400 determines whether the relevance value ri of the i-th retrieved document is equal to "0" or not. When the relevance value ri is equal to "0", step 410 carries out the process of "Case 1". Step 410 carries out the process of "Case 1" in accordance with a flowchart shown in FIG. 5. In FIG. 5, step 411 selects a keyword Km from keywords included in the query, and then step 412 selects a keyword Kn from keywords (Ai) given to the i-th document. Step 413 calculates the changing value ΔWmn on the basis of the formula (30) and calculates a new relationship value Wmn which represents the degree of the relationship between the keywords Km and Kn.

Step 413 includes steps 421 through 425. The sub-condition number h which is a number given to each sub-query is initially set to "1" in step 421. Then, "tmp" is initially set to "0" in step 422, where, finaly, "tmp" becomes as follows:

$$tmp = \sum_{h=1}^{N} \frac{\partial ri(h)}{\partial Wmn} \frac{1}{ri(h)}$$

After that, while the sub-condition number h is successively incremented to N (step 425), a new "tmp" value is calculated by using the last "tmp" in step 423, as follows:

$$tmp = tmp + F(i,h,Km,Kn)/ri(h)$$

$$F(i,h,Km,Kn) = \frac{\partial ri(h)}{\partial Wmn}$$

When the sub-condition number reaches to N and the process for all sub-queries is finished (step 424 finally, the changing value ΔWmn is calculated. Then, step 426 calculates the new relationship value Wmn on the basis of formula (14). That is, the calculation where $$Wmn = g \, (Wmn + \alpha \times (t-ri) \times tmp)$$

is performed. The process which is carried out in steps 412 and 413 is repeated for all keywords given to the i-th document (step 414). Then, when the process for all keywords given to the i-th document is finished, the process which is carried out in steps 411, 412, 413 and 414 is repeated for all keywords included in the query (step 415). As a result, new relationship values Wmn between every keyword given to the i-th document and every keyword included in the query are obtained.

On the other hand, when step 400, shown in FIG. 4, determines that the relevance value ri is not equal to "0", step 500 calculates new relationship values in the keyword connection, as follows.

The sub-condition number h, a count value which represents a number of h fulfilling the condition where ri(h) is equal to "0" and the tmp value are respectively initially set (steps 501, 502 and 503) so that:

H=1 count=0 tmp=0.0 where, finally, "tmp" becomes as follows:

$$tmp = \left\{ \prod_{\substack{k=1\\s.t.k\neq h^*}}^{N} ri(k) \right\}$$

After that, step 504 determines whether the sub-relevance value ri(h) is equal to "0.0" or not. Then, when the sub-relevance value ri(h) is not equal to "0.0", the tmp value is multiplied by the sub-relevance value ri(h) in step 505. The product of tmp×ri(h) becomes a new tmp value. When sub-relevance value ri(h) is equal to "0" in step 504, step 508 determines whether the count value is greater than "1" or not. When the count value is not greater than "1", the count value is incremented in step 509, and then sub condition number h is replaced with h * in step 510. While the sub condition number h is successively incremented, the process in step 505 or in steps 509 and 510 is repeated (steps 506 and 507). Then, if the count value becomes greater than "1" in step 508, the process is finished at this time. In this case, on the basis of the formula (28) described above, the relationship values in the keyword connection are not changed (ΔWmn=0).

Figure 6:
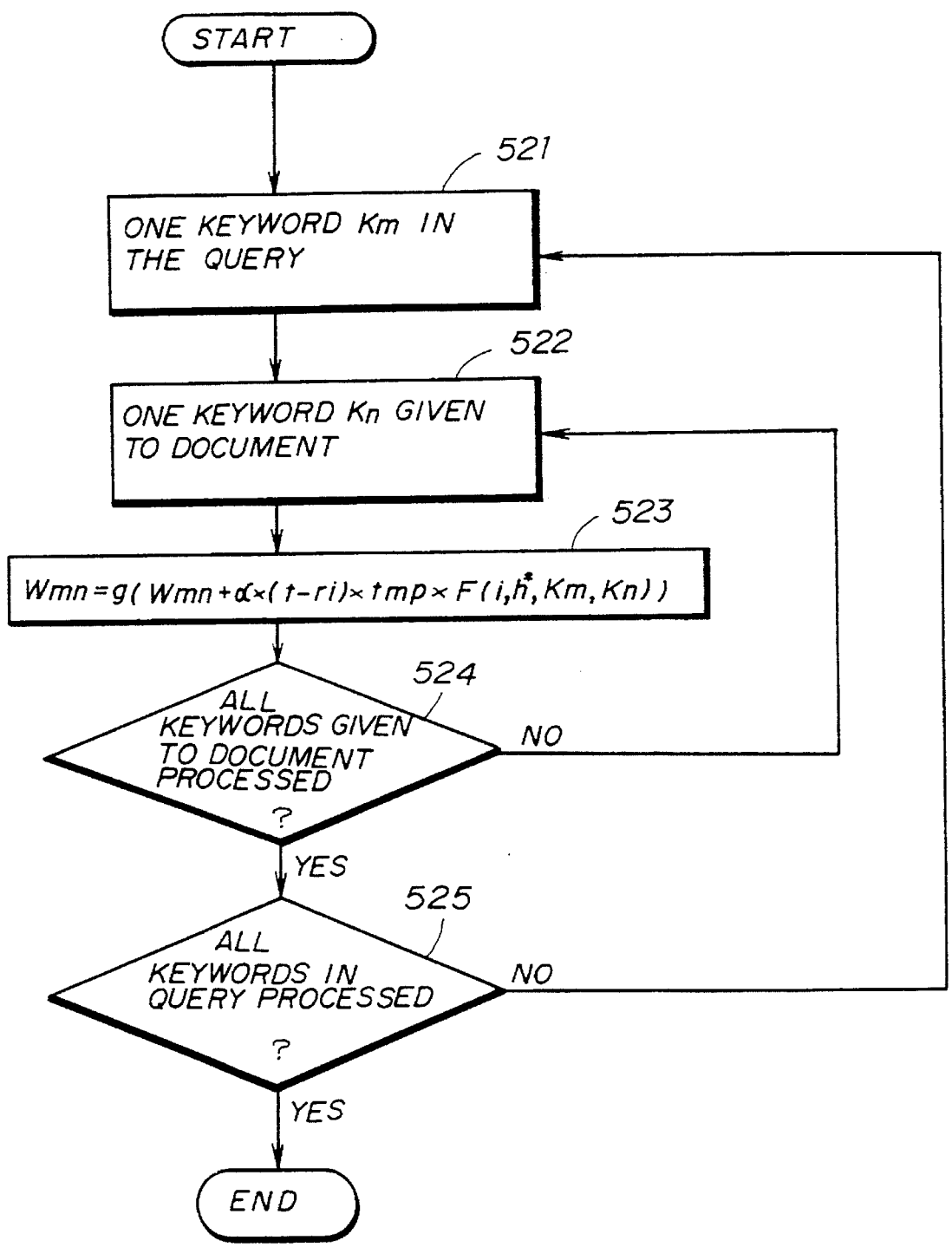
FIG. 6 is a flow chart illustrating a process executed according to the present invention, in accordance with a second case of FIG. 4.

When the sub condition number h reaches to N, that is, when the process with regard to all subqueries is finished, step 520 carries out the process of "Case 2" in accordance with a flowchart shown in FIG. 6. In FIG. 6, step 521 selects a keyword Km from keywords included in the query, and step 522 selects a keyword Kn from keywords given to the i-th document. Step 523 calculates the changing value $\Delta Wmn$ on the basis of the formula (26) and calculates a new relationship value Wmn which represents the degree of the relationship between the keywords Km and Kn on the basis of the formula (14). That is, the calculation where $$Wmn = g(Wmn + \alpha \times (t - ri) \times tmp \times F(i, h^*, Km, Kn))$$

is performed. In this formula, tmp value and h * have been calculated in step 500 shown in FIG. 4, and F(i, h *, Km, Kn) is the partial differential in the formula (26), as follows:

$$F(i, h^*, Km, Kn) = \frac{\partial ri(h^*)}{\partial Wmn}$$

The process which is carried out in steps 522 and 523 is repeated for all keywords given to the i-th document (step 524). Then, when the process for all keywords given to the i-th document is finished, the process which is carried out in steps 521, 522, 523 and 524 is repeated for all keywords included in the query ( step 525 ). As a result, new relationship values Wmn between every keyword given to the i-th document and every keyword included in the query are obtained.

When the learning process described above is finished, the learning control part 22 supplies new relationship values through the request processor part 20 to the keyword connection control section 13. Then the keyword connection control section 13 replaces the corresponding relationship values in the keyword connection matrix stored in the file 15 with the new relationship values.

(3-2) In the case where the query is expressed by the disjunctive normal form;

The following formula is obtained according to the formula (12):

$$\frac{\partial ri}{\partial Wmn} = \sum_{h=1}^{N} \left\{ \frac{\partial ri(h)}{\partial Wmn} \prod_{\substack{k=1 \\ s.t.k. \neq h}}^{N} (1 - ri(k)) \right\} \quad (29)$$

This formula (29) can be converted into simple calculation formulas as follows.

In the case where $ri(h) \neq 1$;

$ri(h)$ is not equal to "0" for all h ($1 \leq h \leq N$) so that the following formula is obtained:

$$\prod_{\substack{k=1 \\ s.t.k. \neq h}}^{N} (1 - ri(k)) = \frac{1 - ri}{1 - ri(k)} \quad (30)$$

Thus, the formula (29) is converted as follows.

$$\frac{\partial ri}{\partial Wmn} = (1 - ri) \sum_{h=1}^{N} \left\{ \frac{\partial ri(h)}{\partial Wmn} \cdot \frac{1}{1 - ri(h)} \right\} \quad (31)$$

In the case where $ri(h) = 1$ ;

formulas differ from each other in accordance with the number of the subquery in which the sub-relevance value $ri(h)$ is equal to "1". When the number of the subquery in which $ri(h)=1$ is equal to "1", the formula (29) is converted as follows:

$$\frac{\partial ri}{\partial Wmn} = \frac{\partial ri(h^*)}{\partial Wmn} \left\{ \prod_{\substack{k=1 \\ s.t.k. \neq h^*}}^{N} (1 - ri(k)) \right\} \quad (32)$$

In the formula (32), h* makes $ri(h^*)=1$.

On the other hand, when the number of the subquery in which the sub-relevance value $ri(h)$ is equal to "1" is equal to or greater than "2", the formula (29) is converted into as follows.

$$\frac{\partial ri}{\partial Wmn} = 0 \quad (33)$$

A partial differential ($\partial ri(h)/\partial Wmn$) must be calculated to obtain the partial differential($\partial ri/\partial Wmn$) in accordance with formula (31) or (32).

A description will be given of a procedure for calculating the partial differential $\partial ri(h)/\partial Wmn$).

Due to the assumption that no keywords are included in both the set $Q^+$ (h) and the set $Q^-$ (h), the partial differential($\partial ri(h)/\partial Wmn$) can be calculated in each case of three cases as follows.

① First case: $Km \in Q^+$ (h)

The following calculation formula of the partial differential($\partial ri(h)/\partial Wmn$) is obtained.

$$\frac{\partial ri(h)}{\partial Wmn} = \begin{cases} \frac{1 - Rim}{Rim} \cdot \frac{1 - ri(h)}{1 - Wmn} \\ : Kn \in Ai \ \& \ Wmn \neq 1 \ \& \ Rim \neq 1 \\[4pt] ri(h) \left\{ \prod_{\substack{Kk \in Ai \\ s.t.k \neq n}} (1 - Wmk) \right\} \\ : Kn \in Ai \ \& \ Wmn = 1 \\[4pt] \left( \prod_{Kj \in Q^- (h)} Sij \right) \left( \prod_{Kj \in Q^+ (h)} Rij \right) \\ : Kn \in Ai \ \& \ Rim = 0 \\[4pt] 0 : \text{otherwise} \end{cases} \quad (34)$$

② Second case: $Km \in Q^-$ (h)

The following calculation formula of the partial differential($\partial ri(h)/\partial Wmn$) is obtained.

$$\frac{\partial ri(h)}{\partial Wmn} = \begin{cases} -\frac{1 - ri(h)}{1 - Wmn} \\ : Kn \in Ai \ \& \ Wmn \neq 1 \\[4pt] -\left( \prod_{Kj \in Q^+ (h)} Rij \right) \left\{ \prod_{\substack{Kj \in Q^- (h) \\ Kk \in Ai \\ s.t.(j,k) \neq (m,n)}} (1 - Wjk) \right\} \\ : Kn \in Ai \ \& \ Wmn = 1 \\[4pt] 0 : \text{otherwise} \end{cases} \quad (35)$$

③ Third case: $Km \in Q^+$ (h) & $Km \in Q^-$ (h)

In this case, the calculation formula is simple. That, is $$\frac{\partial ri(h)}{\partial Wmn} = 0 \quad (36)$$

As has been described above, the partial differetial($\partial ri(h)/\partial Wmn$) can be calculated by using the formulas (31) (32) (33) (34) (35) and (36). When $Km \in$ Query or $Kn \in Ai$ where $$\text{Query} = \bigcup_{h=1}^{N} \{Q^+(h) \cup Q^-(h)\} \quad (37)$$

$\Delta Wmn$ is equal to "0" ($\Delta Wmn=0$). Thus, the partial fifferential($\partial$ ri(h)/$\partial$ Wmn) is calculated with regard to only a set(m,n) which fulfills the condition where $Km \in$ Query and $Kn \in Ai$.

In the process of the learning of the keyword connection as has been described above, the user inputs the evaluation value t with regard to the retrieved document, in which the relevance value is given, to the system. The evaluation value t is a real number in a range between 0 and 1, and represents the suitability of the retrieved document. The evaluation value is "1" when the retrieved document is desired by the user, and the evaluation value is "0" when the retrieved document is not desired by the user. In addition, when the user's evaluation is vague, for example, in a case where the document is not desired very much by the user, the evaluation value is an arbitrary value between 0 and 1.

It is difficult for the user to represent the evaluation of the retrieved document by a real number in the range between 0 and 1.

Accordingly, in this document retrieval system, the user can give the evaluation of N ranks ($N \geq 2$). The greater the evaluation rank is, the greater the corresponding evaluation value that is set. When the user gives the n-th rank of the evaluation, the evaluation value t is calculated in accordance with $t=f(n)$. The function $f(n)$ must fulfill the following conditions:

$$f(N)=1.0 \quad (38)$$

$$f(0)=0.0 \quad (39)$$

For example, the function f(n) is determined as follows:

$$f(n) = \frac{n-1}{N-1} \quad (40)$$

In this function f(n) in which N is determined equal to 5 (N=5), when the user gives the fifth rank of evaluation (n=5), the evaluation value t is equal to 1.0 (t=1.0), and when the user gives the second rank of evaluation (n=2), the evaluation value t is equal to 0.25 (t=0.25).

A description will now be given of an interface for the user to input the ranks of the user's evaluation of the retrieved document with reference to FIGS. 7 through 9.

The retrieval result is displayed on the display divice 24 as shown in FIG. 7. In FIG. 7, the display is divided into a plurality of windows. A window 50 indicates a title of "RETRIEVAL RESULT" and the process after retrieving such as "EDIT", "DISPLAY" and the like. A window 54 indicates retrieval information. The retrieval information inculudes the rank number of the document, the relevance value of the document and the title of the document. The retrieved documents are desplayed in downward sequential order of the relevance value. If the user wants to see the content of the retrieved document, "DISPLAY" in the window 50 is selected by a mouse or the key board 23. Then a rank number corresponding to the document is selected so that the content and the bibliographical information of the selected document and the like are displayed as shown in FIG. 8. That is, windows on the display device 24 are changed. In FIG. 8, a window 55 indicates "BIBLIOGRAPHICAL INFORMATION" and the next process such as "LEARNING", and the like. A window 56 indicates information with regard to the selected document. A window 57 indicates a title of "TEXT", and a window 58 indicates the content of the selected document. When the "LEARNING" in the window 55 is selected by the mouse or the key board 23, a new window 60 which overlaps the windows 56 and 57 is generated on the display device 24. In the window 60, five marks 62(1) through 62(5) are indicated. The marks 62(1) through 62(5) correspond to the five ranks of the evaluation of the retrieved document. The first mark 62(1) corresponds to the greatest evaluation degree, and the fifth mark 62(5) corresponds to the least evaluation degree. Then, each of marks 62(2) through 62(4) corresponds to an evaluation degree less than the greatest one and greater than the least one, and they are arranged in downward sequential order of the evaluation degree. For example, when N is equal to 5 (N=5), the mark 62(1) corresponds to the condition where n=5, the mark 62(2) corresponds to the condition where n=4, the mark 62(3) corresponds to the condition where n=3, the mark 63(4) corresponds to the condition where n=2 and the mark 62(5) corresponds to the condition where n=1. Then, when the user selects one of the marks 62(1) through 62(5), the evaluation value t is calculated in accordance with the formula (51) by using the corresponding n. For example, when the user selects the mark 62(3), n=3 so that the evaluation value t becomes to 0.5 (t=0.5). This calculated evaluation value t is supplied to the learning control part 22, and the learning control part 22 performs the learning process on the basis of the suplied evaluation value t, as has been described above.

Thus, at the time of the learning of the keyword connection, it is not necessary for the user to directly input the evaluation value t which is the exact real number. The user simply selects one of the marks indicated on the display device 24 so that the learning of the keyword connection is carried out.

Figure 9:
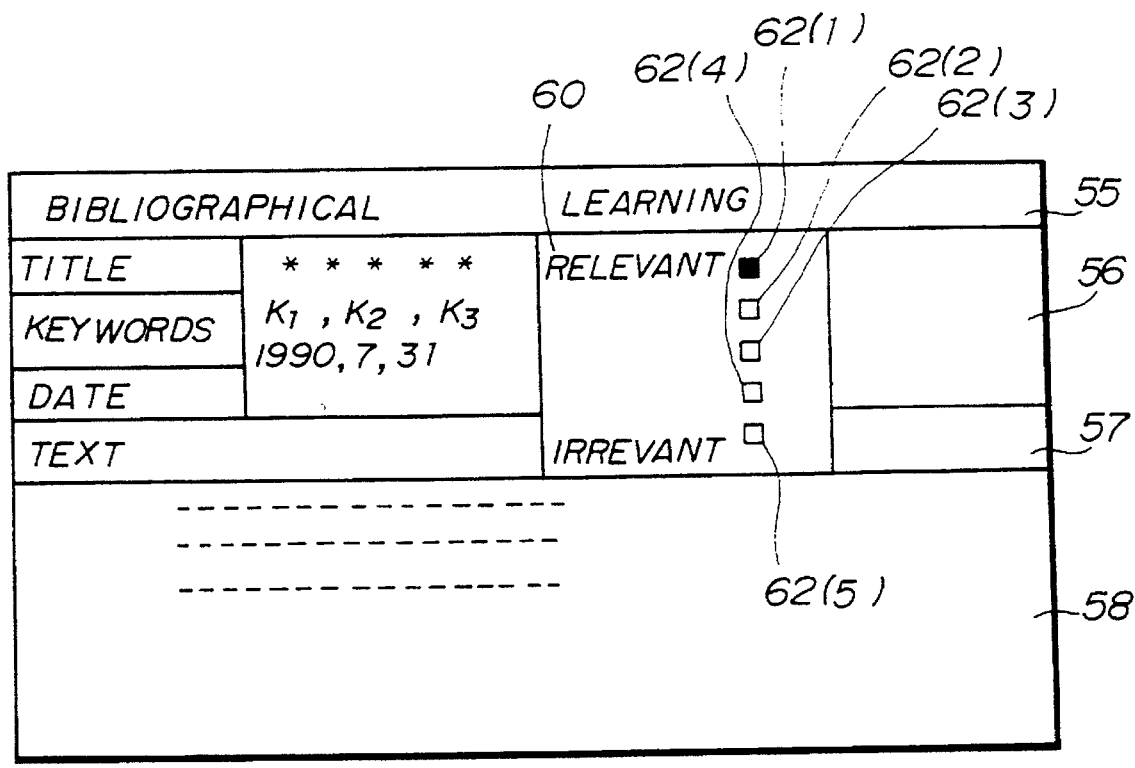
FIG. 9 illustrates a screen used to allow input of evaluation information for the learning function of the present invention.

The processes for the learning of the keyword connection described with reference to FIGS.7 through 9 are performed in the request processor part 20, the display control part 21 and the learning control part 22.

In the embodiments described above, keywords for documents are input by the user from the key board 23, and the document control section 14 generates and stores the inverted file which indicates the relation between the keywords and each of the documents. However, it is possible to provide a keyword extracting part which extracts keywords from documents when registering the document, and to provide an inverted file generator which is supplied with registered documents and keywords and generates the inverted file. The keyword extracting part and the inverted file generator described above are further disclosed in co-pending U.S. patent application Ser. No. 296,769, the disclosure of which is hereby incorporated by reference.

According to the present invention, it is possible to provide a document retrieval system in which the relevance value is calculated in regard to the keyword formula containing keywords connected by the logical OR, AND and NOT, and the learning is performed, which changes the keyword connection so that the retrieval result fits the user's query.

The present invention is not limited to the aforementioned embodiments, and variations and modifications may be made thereof without departing from the scope of the claimed invention.

What is claimed is:

1. A document retrieval system for retrieving documents from documents registered in a document database responsive to a retrieval condition designated by a user, said document retrieval system comprising:

a) query converting means for converting said retrieval condition designated by the user into a query having a predetermined normal form in which keywords and at least one type of logical operation out of logical operations AND, OR and NOT are connected;

b) bibliographical information indicating means for indicating at least information concerning which keywords correspond to each document of the documents registered in said document database;

c) a keyword connection table having relationship values, each of the relationship values representing a degree of relationship between keywords;

d) ranking means for ranking documents in accordance with relevance values, each relevance value indicating a degree to which a document fulfills the retrieval condition corresponding to the query, each of said relevance values being calculated for the document using the relationship values provided in said keyword connection table, wherein connected keywords are obtained with reference to the information indicated by said bibliographical indicating means as (1) keywords corresponding to the document and (2) keywords included in the query obtained by said query converting means;

e) outputting means for outputting, as a retrieval result, the documents ranked by said ranking means;

f) inputting means for inputting evaluation information indicating a degree to which each of the documents output by said outputting means is relevant to a document required by the user; and g) learning means for modifying one or a plurality of said relationship values in said keyword connection table based on the evaluation information input by said inputting means;

wherein said query converting means includes first means for generating a first query in a conjunctive normal form, said first query in the conjunctive normal form having subqueries which are connected with each other only by logical AND operations, each of said subqueries being expressed by at least one keyword connected by at least one of logical OR and NOT operations; and wherein said ranking means includes:
1) first calculation means for calculating a sub-relevance value for each of said subqueries, said sub-relevance value indicating a degree to which each document fulfills each of said subqueries; and
2) second calculation means for calculating a relevance value for each of the documents using said sub-relevance value calculated for each of said subqueries by said first calculation means.

2. A document retrieval system as claimed in claim 1, wherein said second calculation means calculates said relevance value in accordance with the following formula, $$ri = \prod_{h=1}^{N} ri(h)$$

where ri is said relevance value, ri(h) is said sub-relevance value calculated by said first calculation means and N is the number of said subqueries making up said query.

3. A document retrieval system for retrieving documents from documents registered in a document database responsive to a retrieval condition designated by a user, said document retrieval system comprising:

a) query converting means for converting said retrieval condition designated by the user into a query having a predetermined normal form in which keywords and at least one type of logical operation out of logical operations AND, OR and NOT are connected;

b) bibliographical information indicating means for indicating at least information concerning which keywords correspond to each document of the documents registered in said document database;

c) a keyword connection table having relationship values, each of the relationship values representing a degree of relationship between keywords;

d) ranking means for ranking documents in accordance with relevance values, each relevance value indicating a degree to which a document fulfills the retrieval condition corresponding to the query, each of said relevance values being calculated for the document using the relationship values provided in said keyword connection table, wherein connected keywords are obtained with reference to the information indicated by said bibliographical indicating means as (1) keywords corresponding to the document and (2) keywords included in the query obtained by said query converting means;

e) outputting means for outputting, as a retrieval result, the documents ranked by said ranking means;

f) inputting means for inputting evaluation information indicating a degree to which each of the documents output by said outputting means is relevant to a document required by the user; and g) learning means for modifying one or a plurality of said relationship values in said keyword connection table based on the evaluation information input by said inputting means;

wherein said query converting means includes second means for generating a second query in a disjunctive normal form, said second query in the disjunctive normal form having subqueries which are connected with each other only by logical OR operations, each of said subqueries being expressed by at least one keyword connected by at least one of logical AND and NOT operations;

wherein said ranking means includes:
1) first calculation means for calculating a sub-relevance value for each of said subqueries, said sub-relevance value indicating a degree to which each document fulfills each of said subqueries; and
2) second calculation means for calculating a relevance value for each of the documents using said sub-relevance value calculated for each of said subqueries by said first calculation means.

4. A document retrieval system as claimed in claim 3, wherein said second calculation means calculates said relevance value in accordance with the following formula, $$ri = 1 - \prod_{h=1}^{N} (1 - ri(h))$$

where ri is said relevance value, ri(h) is said sub-relevance value calculated by said first calculation means and N is the number of said subqueries making up said query.

5. A document retrieval system as claimed in claim 1 or claim 3, wherein said ranking means includes:

sorting means for sorting the documents in a downward sequential order of said relevance values corresponding to the documents.

6. A document retrieval system as claimed in claim 5, wherein said relevance value is a value within a range which is equal to or greater than 0 and is equal to or less than 1.

7. A document retrieval system as claimed in claim 1 or claim 3, wherein:

said evaluation information has an evaluation value which is a value indicated by a real number; and the evaluation value corresponds to the degree of relevance required by the user for each of the documents.

8. A document retrieval system as claimed in claim 7, wherein said relevance value is a value within a range which is equal to or greater than 0 and is equal to or less than 1, and said evaluation value is an arbitrary value within a range which is equal to or greater than 0 and is equal to or less than 1.

9. A document retrieval system as claimed in claim 8, wherein said learning means has first means for modifying one or a plurality of said relationship values in said keyword connection table when said relevance value obtained by said calculation means is equal to 0, and second means for modifying one or a plurality of said relationship relation values in said keyword connection table when said relevance value obtained by said calculation means is not equal to 0.

10. A document retrieval system as claimed in claim 7, wherein said inputting means has a numerical value inputting part for inputting said evaluation value.

11. A document retrieval system as claimed in claim 10, wherein:

said learning means has (1) a difference calculating part for calculating a difference between said evaluation value from said numeral value inputting part and said relevance value from said ranking means, and (2) a modifying part for modifying one or a plurality of said relationship values in said keyword connection table based on the difference calculated by said difference calculating part; and said one or a plurality of said relationship values are modified so that said relevance value increases when said evaluation value is greater than said relevance value and said relevance value decreases when said evaluation value is less than said relevance value.

12. A document retrieval system as claimed in claim 7, wherein said inputting means includes:

a rank designating part for designating an evaluation rank which indicates the degree of relevance required by the user for each of the documents output by said outputting means, the evaluation rank being indicated by a number; and a converting part for converting said evaluation rank designated by said designating part into said evaluation value, the greater the evaluation rank indicating a correspondingly greater evaluation value is set.

13. A document retrieval system as claimed in claim 12, wherein said converting part converts said number of said rank into said evaluation value in accordance with the following formula, $$f = \frac{n-1}{N-1}$$

where n is the number of said rank, N is the maximum number of said rank and f is said evaluation value.

14. A document retrieval system as claimed in claim 12, wherein:

said learning means has (1) a difference calculating part for calculating a difference between said evaluation value from said converting part and said relevance value from said ranking means; and (2) a modifying part for modifying one or a plurality of said relationship values in said keyword connection table based on the difference calculated by said difference calculating part; and said one or a plurality of said relationship values are modified so that said relevance value increases when said evaluation value is greater than said relevance value and said relevance value decreases when said evaluation value is less than said relevance value.

15. A document retrieval system as claimed in claim 12, wherein:

said designating part has a plurality of input elements, each of said input elements corresponding to one evaluation rank; and when one of said plurality of input elements is designated by the user, a corresponding evaluation rank is supplied from said one of said plurality input elements to said converting part.

16. A document retrieval system as claimed in claim 15, wherein each of said plurality of input elements has an icon indicated on a display device.

* * * * *

UNITED STATES PATENT AND TRADEMARK OFFICE
CERTIFICATE OF CORRECTION

PATENT NO. : 5,535,382
DATED : July 9, 1996
INVENTOR(S) : Yasushi OGAWA.

It is certified that error appears in the above-indentified patent and that said Letters Patent is hereby corrected as shown below:

At column 2, line 42, delete the second occurrence of the word "the";

At column 2, line 49, delete "fof" and insert --of--;

At column 4, line 48, delete the second occurrence of the phrase "to the learning";

At column 5, line 27, insert --(-- before "step";

At column 10, formula (21), delete "$\partial$ Ri(h)" and insert --$\partial$ ri(h)--;

At column 11, formula (26), delete "$\left\{ \begin{array}{c} N \\ ri(k) \\ k=1 \\ s.t.k \neq h^* \end{array} \right\}$" and insert -- $\left\{ \begin{array}{c} N \\ \Pi \quad ri(k) \\ k=1 \\ s.t.k \neq h^* \end{array} \right\}$ --;

At column 12, line 14, insert --)-- after "424";

At column 16, line 26, delete "suplied" and insert --supplied--;

UNITED STATES PATENT AND TRADEMARK OFFICE
CERTIFICATE OF CORRECTION

PATENT NO. : 5,535,382
DATED : July 9, 1996
INVENTOR(S) : Yasushi OGAWA

It is certified that error appears in the above-indentified patent and that said Letters Patent is hereby corrected as shown below:

At column 19, line 18, claim 9, delete "relation" and insert
--said relationship values in said keyword connection table--.

Signed and Sealed this

Eighteenth Day of March, 1997

*Attest:*

BRUCE LEHMAN

*Attesting Officer*  Commissioner of Patents and Trademarks